Jan. 15, 1924.                                                    1,481,191
                        T. V. ELLIOTT ET AL
           MACHINE FOR CUTTING OFF AND THREADING PIPES
                   Filed Sept. 28, 1921      6 Sheets-Sheet 1
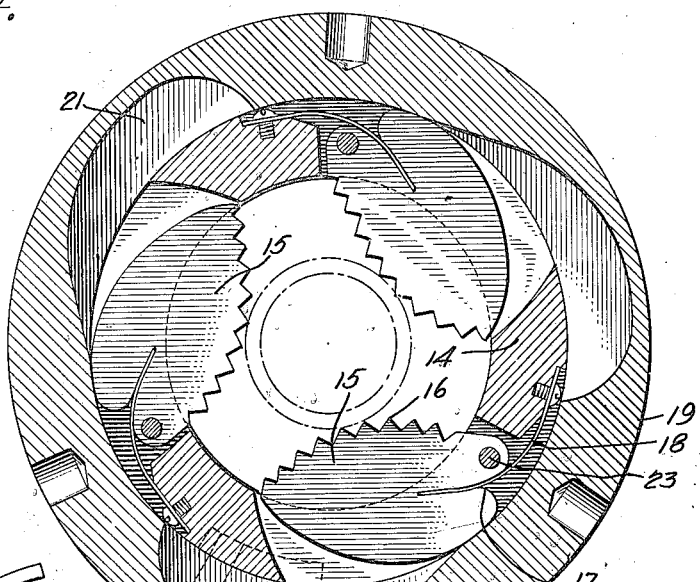
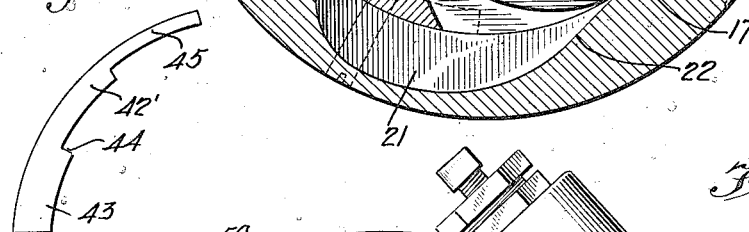
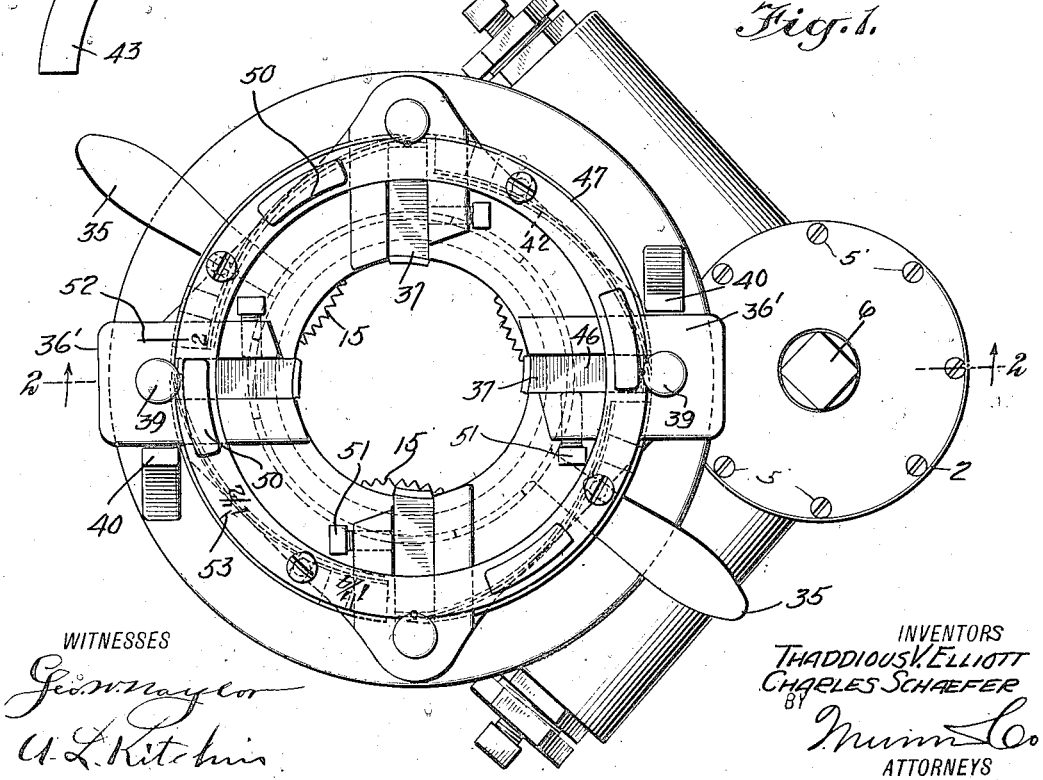
WITNESSES
INVENTORS
THADDIOUS V. ELLIOTT
CHARLES SCHAEFER
BY
ATTORNEYS

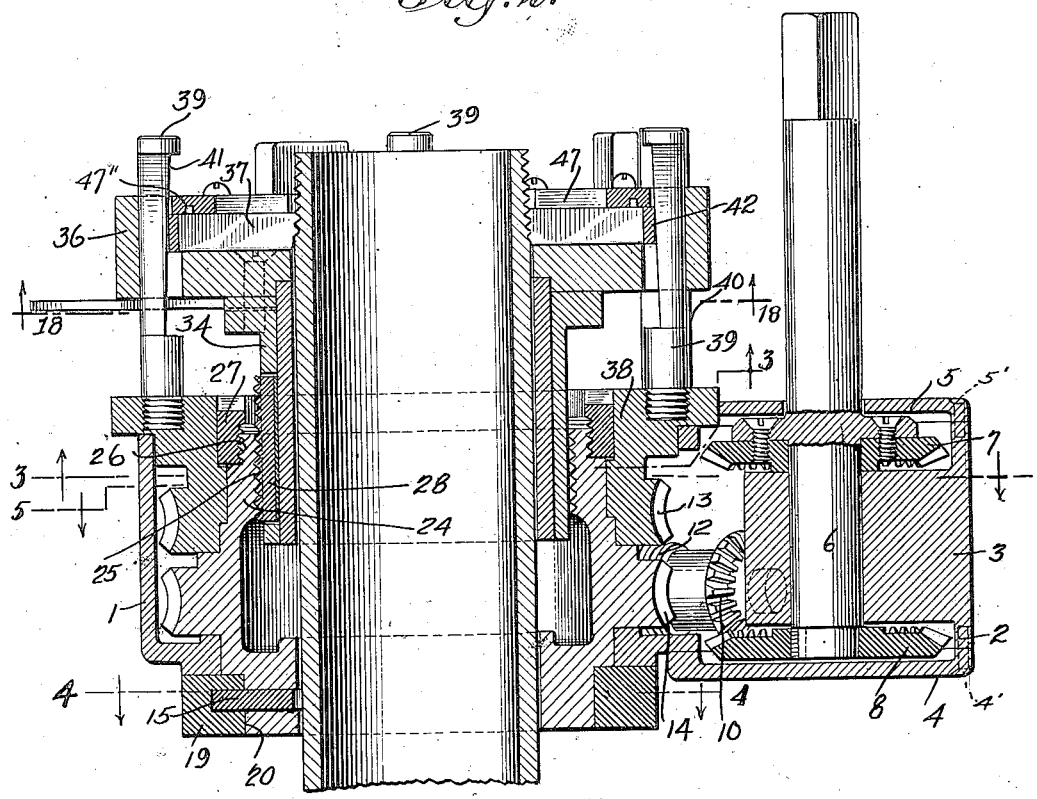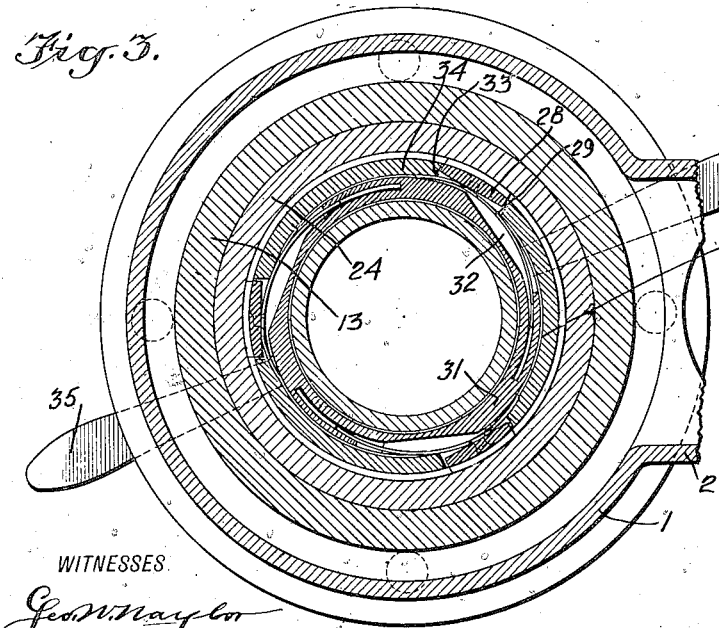

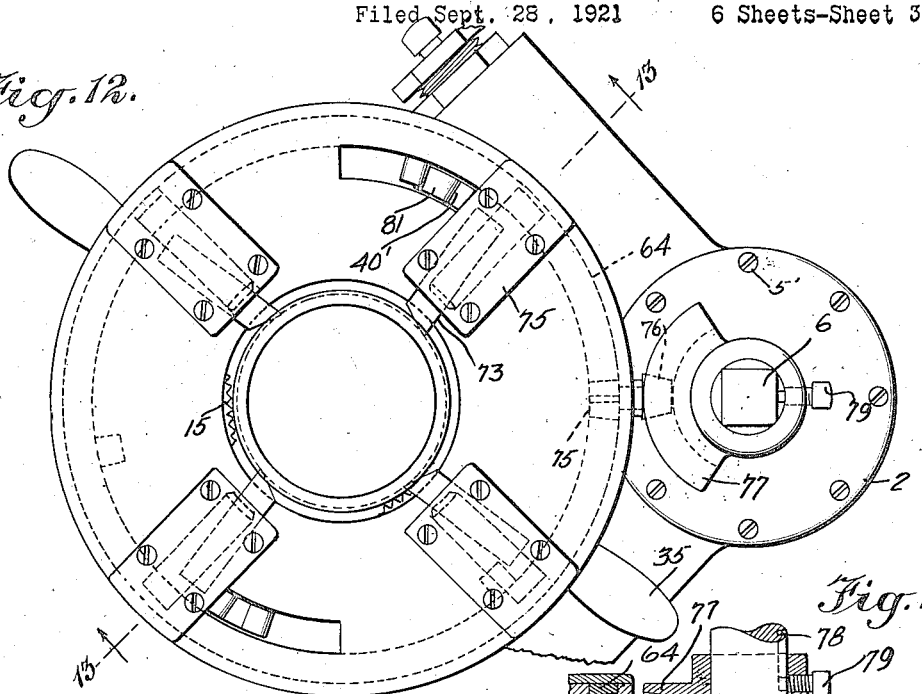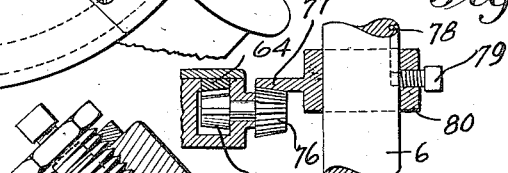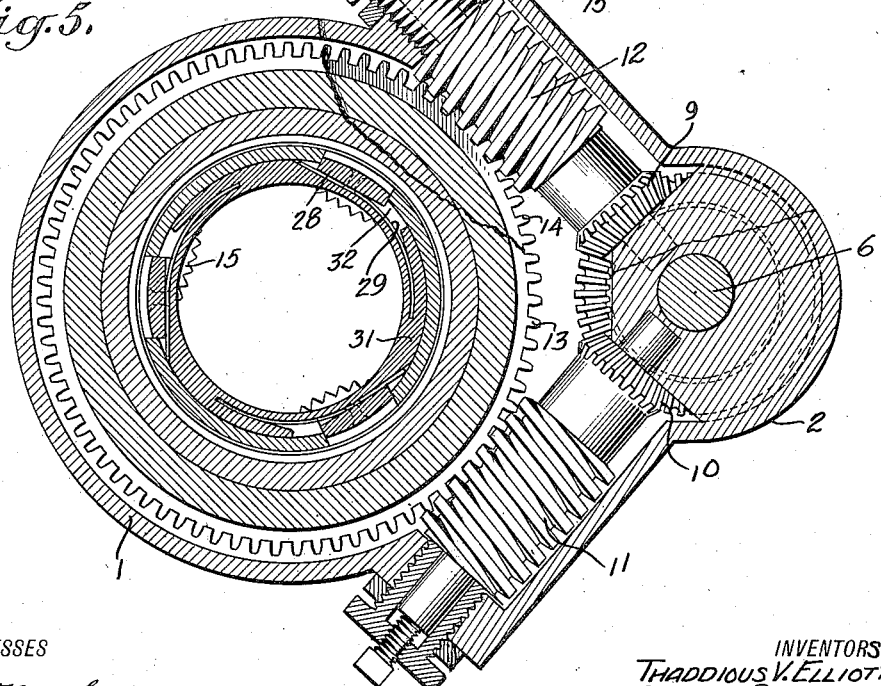

Jan. 15, 1924.
T. V. ELLIOTT ET AL
1,481,191
MACHINE FOR CUTTING OFF AND THREADING PIPES
Filed Sept. 28, 1921
6 Sheets-Sheet 4
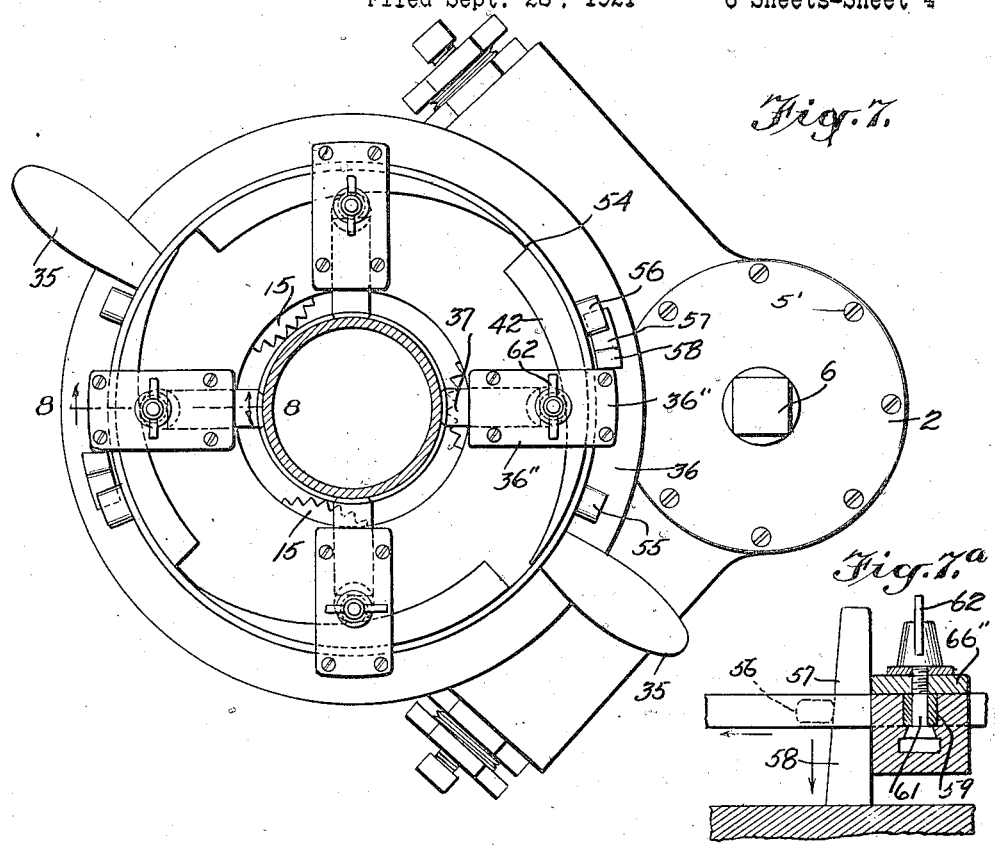
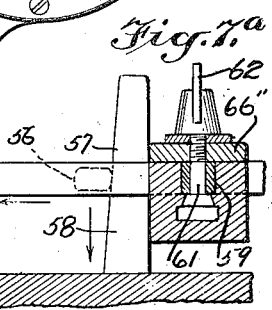
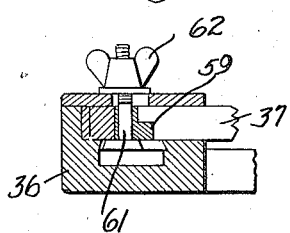
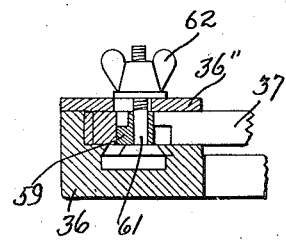

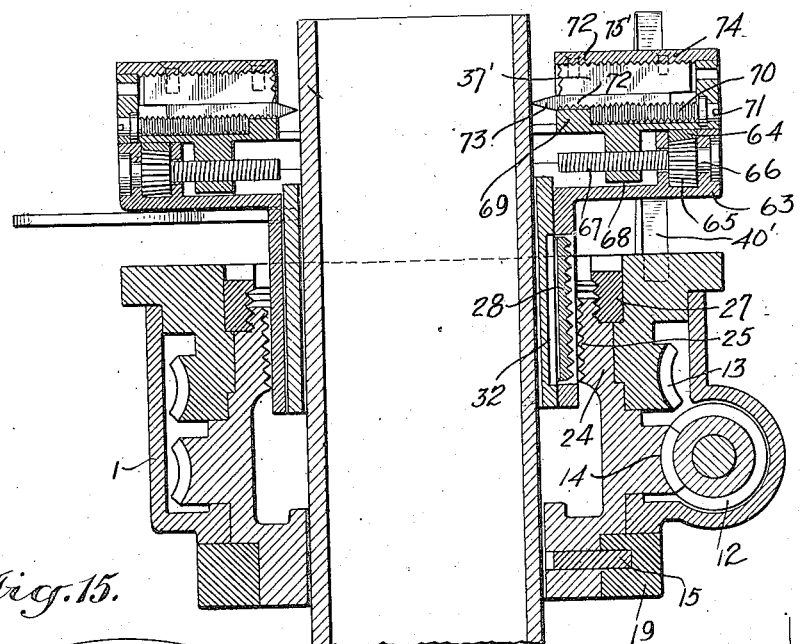

Jan. 15, 1924.
T. V. ELLIOTT ET AL
1,481,191
MACHINE FOR CUTTING OFF AND THREADING PIPES
Filed Sept. 28, 1921    6 Sheets-Sheet 6
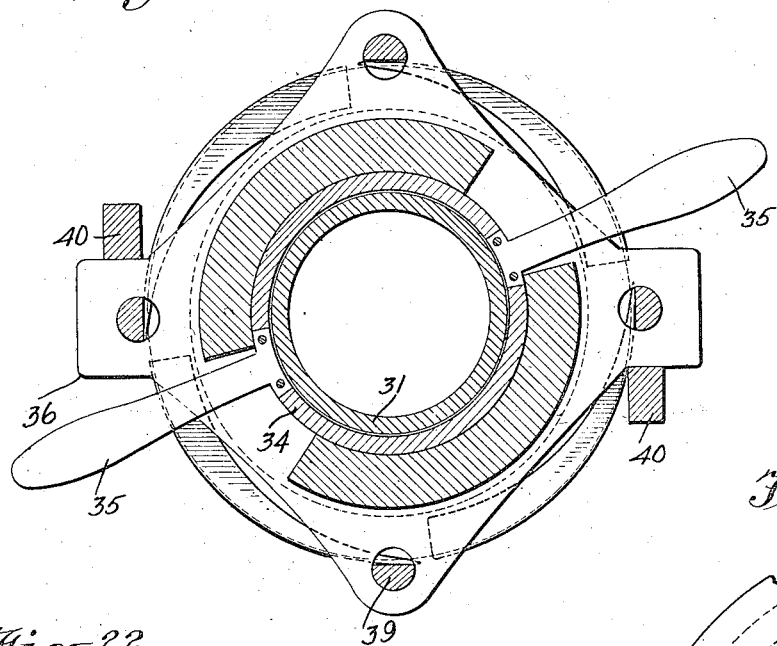
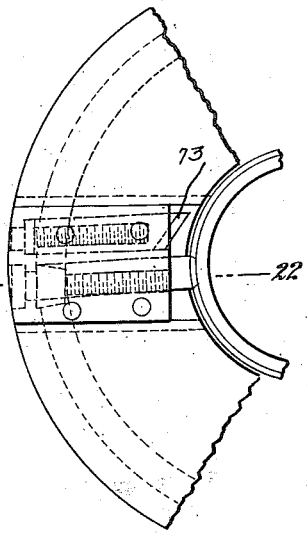
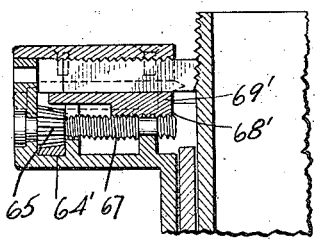
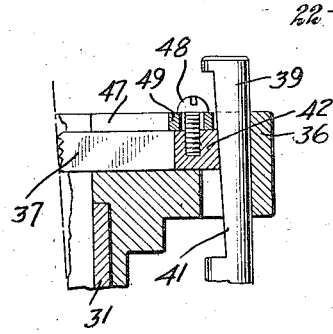
WITNESSES
INVENTORS
THADDIOUS V. ELLIOTT
CHARLES SCHAEFER
BY
ATTORNEYS Patented Jan. 15, 1924.

1,481,191

UNITED STATES PATENT OFFICE.

THADDIOUS V. ELLIOTT AND CHARLES SCHAEFER, OF NEW BRUNSWICK, NEW JERSEY.

MACHINE FOR CUTTING OFF AND THREADING PIPES.

Application filed September 28, 1921. Serial No. 503,716.

*To all whom it may concern:*

Be it known that we, THADDIOUS V. ELLIOTT and CHARLES SCHAEFER, both citizens of the United States, and residents of New Brunswick, in the county of Middlesex and State of New Jersey, have invented a new and Improved Machine for Cutting Off and Threading Pipes, of which the following is a full, clear, and exact description.

This invention relates to pipe threading and cutting off machines and has for an object to provide an improved construction which will grip a pipe and readily cut a tread thereon or sever a section therefrom with a minimum power and with the use of a minimum time.

Another object in view is to provide a thread cutter for pipes which may be operated by power or by hand and which will first grip the pipe and then quickly feed threading tools thereover, the arrangement being such that the threading tools may be readily disengaged from the pipe for a return to their original position or the removal of the machine without the usual backing off action.

A further object of the invention is to provide a thread cutting device wherein either tapered or stepped forms of adjusting members may be provided for the cutting tools and means associated therewith for gripping a pipe and then quickly rotating the cutting members.

A still further object is to provide a threading and cutting tool wherein the cutters when used, may be simultaneously fed into a cutting action while at the same time permitting manual feeding of any particular cutter.

An additional object is to provide a threading and cutting off machine wherein the same driving mechanism is used for driving the cutters, for cutting off the pipe and driving the threading members for threading the pipe.

In the accompanying drawings—

Figure 1 is a top plan view of a tool disclosing one embodiment of the invention.

Figure 2 is a vertical sectional view through Figure 1 approximately on line 2—2.

Figure 3 is a sectional view through Figure 2 approximately on line 3—3.

Figure 4 is a sectional view through Figure 2 on line 4—4.

Figure 5 is a sectional view taken through Figure 2 on line 5—5.

Figure 6 is a detail fragmentary top plan view of an adjusting member embodying certain features of the invention.

Figure 7 is a plan view of a slightly modified structure to that shown in Figure 1.

Figure 7a is a detail fragmentary sectional view showing how the driving post illustrated in Figure 7 acts to feed the threading members.

Figure 8 is a fragmentary sectional view through Figure 7 on line 8—8.

Figure 9 is a view similar to Figure 8 but showing the parts in a different position.

Figure 10 is a perspective view of a clamping bolt embodying certain features of the invention.

Figure 11 is a perspective view of a cam embodying certain features of the invention.

Figure 12 is a top plan view of a further modified form of the invention wherein the device is converted into a combined threading machine and pipe cutting machine.

Figure 13 is a sectional view through Figure 12 approximately on line 13—13.

Figure 14 is a fragmentary side view of the structure shown in Figure 12.

Figure 15 is a fragmentary top plan view of a rack embodying certain features of the invention.

Figure 16 is an edge view of part of the rack shown in Figure 15 together with a driving post.

Figure 17 is a detail fragmentary sectional view showing how the rack disclosed in Figures 12 and 13 may be operated.

Figure 18 is a sectional view through Figure 2 approximately on line 18—18.

Figure 19 is a detail fragmentary sectional view showing how the adjusting cams and rings illustrated in Figure 2 are connected.

Figure 20 shows a guide rod or pin embodying certain features of the invention and illustrated from several different angles.

Figure 21 is a detail fragmentary top plan view showing a modified construction to that shown in Figure 13.

Figure 22 is a sectional view through Figure 21 approximately on line 22—22.

In providing devices for threading pipes, it is desirable to provide means which will either cut a straight thread or a tapered thread. In most pipes, a tapered thread is arranged at the end whereby it may be screwed in tight into another pipe or some fitting. In order to cut this form of thread or in fact any kind of thread, considerable power must be used and heretofore a lever of considerable length has been usually provided where the cutting is to be done by hand.

In the present invention, an improved mechanism has been provided to take care of the tapering of the thread or the formation of a straight thread as well as improved structures have been provided for gripping the pipe and then operating the machine during the threading operation.

As shown in Figures 1 to 5 inclusive, a casing 1 is provided which is of a desired shape and which carries an extension or auxiliary casing 2 having a central heavy lug or block 3 and top and bottom plates 4 and 5 which are preferably made removable and held in place by suitable screws 4' and 5'. The auxiliary casing 2 carries a driving shaft 6 which may be driven by power or by a hand operated crank as desired and which has rigidly secured thereto bevel gears 7 and 8 meshing with the bevel gears 9 and 10 (Fig. 5) which latter bevel gears are rigidly secured to the worms 11 and 12 suitably journaled in the casing 2. The worms 11 and 12 mesh respectively with the worm wheels 13 and 14 and by reason of the location of the worms and the bevel gears, these worm wheels operate in opposite directions, when they are both free to rotate. However, ordinarily when the device is in use, worm gear 14 is held stationary by the gripping members 15. In Figure 4, three gripping members are shown but a greater or less number may be used. Each of these gripping members is provided with a toothed or gripping face 16 and with a notch 17 in which one end of spring 18 is mounted while the opposite end is rigidly secured by a screw or otherwise to part of the worm gear 14. Surrounding these gripping members is a clamping ring 19 which is rotatably mounted on a shoulder 20 formed on part of the worm gear 14. This ring is provided with a depression 21 for each gripping member 15 and each of said depressions is provided with an inclined surface 22 which will cause the gripping members to swing on their pivotal supporting pins 23 when the ring 19 is rotated in one direction while the springs 18 will move the gripping members back into the notches 21 when the ring is moved in the opposite direction. When the tool has been properly positioned on the pipe, ring 19 is first operated so that the gripping member 15 will immediately act.

By reason of the gripping action of member 15, the gear wheel 14 will not rotate and will act as a stationary gear and permit the worm 12 to travel around the same when the power shaft 6 is rotated. As the worm 12 travels, it will carry with it the casing 1 and the auxiliary casing 2 together with worm 11 so that the worm wheel 13 will be rotated in this manner and in addition by the rotation of the worm 11 itself. This will give a double speed to the movement of the worm wheel 13 while the action of both of the worms and bevel gears presents a very great leverage so that a comparatively small power is exerted on the shaft 6 and will readily cut a large thread quickly.

From Figure 2 it will be noted that the worm gear 14 is not only provided with an extension having a shoulder 20 but is provided with an oppositely extending annular section 24 which is provided with internal threads 25 and a number of external threads 26. The external threads 26 co-act with a threaded ring or nut 27 used in clamping the worm gear 13 in place but without pinching the same. The internal threads 25 co-act with threaded plates 28, there being shown three threaded plates in the drawing though a greater or less number could be used without departing from the invention. These plates act as means for controlling the pitch of the thread to be cut. The thread to be cut will be identical with the thread on members 28 and when it is desired to cut a different thread, these members must be changed together with the worm gear 14. As the device is intended to cut principally standard threads, it will not be necessary to make this adjustment ordinarily as the pitch of the threads are the same regardless of the size of the pipe. Each of the plates 28 is rigidly secured to a spring 29 (Fig. 3) which spring has one end loosely positioned in a slot 30 in the sleeve 31. The sleeve 31 is provided with a flat portion 32 for each of the plates 28 whereby when the sleeve is opposite the aperture 33 on the depending flange 34, the plates 28 will move back into said notches and, consequently, out of engagement with the threads 25. When it is desired to bring the plates into engagement the parts are moved back to the position shown in Figure 3. This back and forth movement is caused by suitable arms 35 which extend through suitable apertures in the flange 34 and are rigidly secured to the sleeve 31. The sleeve 34 is rigidly secured by screws or other means to a suitable head 36 which carries the threading tools 37 and associated parts hereinafter fully described.

As shown in Figure 2, part of the worm gear 13 rotates on part of the extension 24, and worm gear 14 and is held in place by the locking ring or nut 27. Gear 13 in turn is provided with an annular ring extension 38 in which the guiding posts 39 are threaded. In addition, preferably two driving posts 40 are rigidly secured to the ring section 38 so that whenever gear 13 is rotated, power may be transmitted through the posts 40 to the head 36 which is engaged by these posts as indicated in Figures 1 and 2.

Each of the posts 39 is provided with one or more inclined faces 41 of different inclines to vary the angle of the taper threads to be cut. These faces are adapted at different times to engage the outside faces of the various adjusting cams 42 or the outside face of the auxiliary adjusting cams 42' (Fig. 6). In this last form of cam instead of having a tapering section suitable offset sections 43, 44 and 45 are provided. In the form shown in Figures 2 and 3, the cam 42 as illustrated in Figure 7 is used. In the head 36 a guide-way 46 is provided for each of the threading members 37 which guide these threading members so that they may move radially inwardly or outwardly. An adjusting ring 47 is arranged on the head 36 and also loosely against the upper surface of the cutting members 37, said head being connected to the respective adjusting cams 42 by suitable screws 48 (Fig. 19). These screws extend through radially extending slots 49 so that the cam 42 may move radially without moving circumferentially. This radial movement is necessary to provide the taper of the threads cut on the pipe. The adjusting ring 47 is provided with inclined curved grooves 47' which receive the pins 47'' extending from the various threading members or dies 37. This arrangement permits the operator to bodily force the dies 37 upwardly or inwardly as adjusting ring 47 shifts the cams 42. The cam 42 is first set so that the desired depth of thread will be provided and when set, the cutting member 37 will be against the pipe and the cam will fit snugly between the outer end of the threaded member and the face 41. As the head 36 rotates, threads will be cut on the pipe according to the size of the threads 25 and this cutting operation will cause the threaded members 37 to move bodily toward the driving worm gear 13 and as it moves the cams 42 will be continually forced against the face 41 and as said face inclines outwardly a gradual taper to the thread will be produced until the last rotation will be almost without a thread. By shifting the ring 47 so as to bring a smaller section of the cam 42 opposite the members 37, said members may be manually forced radially and then the gripping members 15 released after which, the pipe may be readily moved from the tool or the tool from the pipe without the usual backing off operation. The arms 35 are then operated for disconnecting the plates 28 from the threads 25. The head 36 is then moved upwardly and the arms 35 again moved until the parts assume the position shown in Figure 3. The tool is then in operation for cutting another thread. A number of lugs 50 are formed on the ring 47 so that a screw driver or other tool may be placed against two of these lugs and the ring rotated in either direction.

When it is desired to cut a straight thread instead of a tapering thread, the ring 47 is rotated until the smallest end of the respective cams 42 are opposite the threading members 37 and then said threaded members are adjusted to fit the pipe after which, the respective set screws 51 are tightened. The shaft 6 is then rotated and the cutting operation performed in the usual manner except that the threads will be straight instead of tapered. When the threading operation has been completed, the device may be backed off or the set screws 51 loosened and members 37 pushed back so that the tool may be readily removed without backing off. From Figure 1 it will be seen that the driving post 40 strikes against the head extensions 36' for rotating the same. This removes the strain from post 39 so that the head may freely move down during the threading operation. As indicated in Figure 1, a zero mark 52 is provided on one of the extensions 36' while the ring 47 is provided with a plurality of graduations or marks 53 indicating different sized pipes. When the parts are positioned as shown in Figure 1 the graduations 52 and 53 are positioned to indicate that the largest sized pipe will be accommodated.

In Figures 7 to 11 inclusive will be seen a modified form of the invention in which the head 36 is provided with a number of extensions 36'' for receiving the various threading members 37. In this form of the invention a thin ring 54 is provided instead of the ring 47 and the cams 42 are rigidly secured thereto in any desired manner. Suitable knobs 55 are provided on the ring 54 for adjusting the same as desired and if preferred, indicating graduations similar to graduations 52 and 53 may be used. In this form of the invention instead of providing a bevel face 41, the ring 34 is provided with adjusting lugs 56 which bear against the inclined face 57 of the driving post 58. This driving post operates in a similar manner to post 40 except for the action of the face 57. The lugs 55 and 56 are designed to operate at different times on the face 57 according to the particular size pipe which is to be threaded. As there is only two lugs 55 and 56 for each post there can be only two adjustments for the cams 52 though, if desired, a greater number of lugs could be provided. However, in order to provide the additional adjustment, a rotatable cam 59 is provided for each of the cams 42, said rotatable cams being carried by the heads 36'' and positioned at the end of the respective cutting members 37.

When the parts are in the position shown in Figure 8, one size of pipe is being cut while in Figure 9 the cam is shown reversed for cutting a smaller size pipe. The cam 59 is provided with a square aperture 60 through which a square shank bolt 61 passes, said bolt extending through a slot in the head 36'' so that the wing nut 62 may be threaded onto the bolt for clamping the rotatable cam 59 in either of its adjusted positions. It will, of course, be noted that the rotatable cam 59 is adapted to be used in either position with either of the lugs 55 and 56 whereby four size pipes may be cut.

In Figures 12, 13, 14 and 16 a second modified form of threading tool is presented which also is arranged with cutting off members for cutting off a pipe at any desired point. The casing 1 and parts arranged therein are identical with that shown in Figure 2 but the head 63 and parts contained thereby are differently formed. Arranged in the head 63 is an annular rack 64 continually meshing with the various pinions 65, which pinions are secured to the respective shafts 66 journaled in suitable enlargements of the heads 63. Each of the shafts 66 is provided with a threaded section 67 fitted into a depending lug 68 of a tool carrier 69, which tool carrier is slidingly mounted in any desired manner in the head 63 so as to slide radially. The carrier 69 is provided with a threaded member 70 having a head provided with a kerf 71 or other tool receiving structure whereby the threaded member may be rotated at any time independently. This threaded member fits against the threaded surface 72 of a cutter 73 whereby said cutter may be independently adjusted toward and from the pipe. Arranged above the cutter 73 is a threading member 37' which, if desired, may be roughened on its upper surface so as to co-act with the roughened lower surface 74 of a clamping plate 75. The clamping plate 75 is connected with the carrier 69 by screws or other desirable means and may be loosened and raised at any time to adjust the threading members 37'. When it is desired to cut off a section of the pipe, the various cutting tools 73 are independently adjusted until they properly contact with the pipe and then the power shaft 6 is rotated for driving the various parts. As the head 63 rotates under the action of the various posts 40', the annular rack 64 will be intermittently moved in a rotary movement whereby the various pinions 65 will be intermittently rotated and, consequently, the carrier 69 will be gradually or rather intermittently fed inwardly toward the pipe. In order to provide for this intermittent movement, a single toothed pinion 75 (Fig. 17) is provided and positioned to intermittently move the annular rack 64. This pinion is rigidly secured to a shaft 75' journaled in part of the head 63 and carrying at its outer end a bevel gear 76 meshing with a segmental rack 77 carried by the shaft 6.

As shown in Figure 17, the shaft 6 is provided with a short vertical slot 78 for receiving the end of set screw 79 which set screw extends through part of the ring 80 formed integral with rack 77 whereby the rack may be locked to the shaft 6 out of engagement with the pinion 76 or in mesh therewith. When the rack 77 is in mesh with pinion 76, the pinion will be given one rotation for each rotation of shaft 6 and, consequently, the single toothed pinion 75 will be given a single revolution so that the annular rack 64 will be moved forward the distance of one tooth for each revolution of the shaft 6. This will cause the cutters to be fed inwardly at the desired speed for properly cutting off the pipe. It is, of course, evident that if a faster feed is desired, rack 77 can be made of sufficient length to turn the pinion 76 over twice for each revolution of the rack or the single toothed pinion 75 could be provided with two or more teeth. When the cutters 73 are not in use, rack 77 is raised and is locked out of engagement with the pinion 76 whereupon the annular rack 64 will not be moved and, consequently, the threading members 37' may be adjusted manually until properly positioned for cutting a thread on the pipe. In order that this thread may taper, the two posts 40' are provided with inclined rear faces 81 which are engaged by a lug 82 projecting from the rack 64. As the head 63 moves downwardly during the cutting operation, the action of the inclined face 81 will be to cause the lugs 82 to move gradually and to gradually rotate to a certain extent rack 64. This will cause the various carriers 69 to be retracted gradually and, consequently, to thereby cause the cutters 37' to produce the desired taper.

In Figures 21 and 22 a modified construction is shown to that illustrated in Figure 13. In this construction the thickness of the head is reduced by moving the cutter 73 off to one side and arranging the annular rack 64' beneath the various pinions 65 instead of on top of the same. The carrier 69' is also provided with an arc-shaped threaded portion 68' on the depending lug 68 whereby it may be shifted upon the rotation of the threaded member 67. This eliminates the lower part of the lug 68 as illustrated in Figure 13 and by this arrangement, together with the arrangement of the cutter 73, a more condensed or compact structure is presented.

What we claim is:—

1. A pipe threading machine comprising a head, a plurality of radially adjustable thread cutting members positioned in said head, a drive mechanism for rotating said head, said drive mechanism including a pair of worm gears, a worm for each gear, a bevel gear secured to each of said worms, a driving gear meshing with each of said bevel gears, means moving with one of said worm gears for actuating said driving gears, and a gripping member for gripping the pipe to be threaded.

2. A pipe threading machine comprising a casing, a primary worm gear arranged in said casing, means for causing the primary worm gear to be gripped to the pipe to be threaded, a secondary worm gear rotatably mounted adjacent the primary worm gear, a worm for each of said gears, said worms and their respective gears being right and left, means carried by the casing for rotating said worms whereby one of the worms will travel around the stationary primary gear and the other will rotate the auxiliary gear at a double speed, a head carried by said auxiliary gear, thread cutting members carried by said head, and means carried by the head for holding the cutters in proper position for cutting the desired thread as said head is rotated.

3. A pipe thread cutting machine comprising a casing, a pair of reversely rotating worm gears carried by the casing, means for clutching one of the worm gears to the pipe to be threaded, driving means connected with said worm gears, said driving means including a pair of worms whereby when the driving means are rotated one of the worm gears will remain stationary and the other rotate at double speed, and means including thread cutting members carried by the worm gear which rotates at double speed.

4. In a pipe thread cutting machine a clutch for clutching the same to the pipe, said clutch comprising a plurality of clutch members, a rotatable ring formed with cam sections for actuating said clutch members in one direction, and means independent of the ring for moving the clutch members back to an inoperative position when permitted by said cam sections.

5. In a thread cutting machine of the character described a plurality of clutch members for clutching a pipe, means for pivotally supporting each of the clutch members, a spring for each of the clutch members for moving the same to an inoperative position, and a rotatable ring having cam sections for moving the clutch members against the action of said spring into a clutching position.

6. In a thread cutter for pipes a thread cutting member and means for driving said cutting member, said means including a driving worm wheel, a worm meshing with said worm wheel, a pinion carried by said worm, a gear meshing with said pinion, and a shaft secured to said gear for rotating the same.

7. In a thread cutting machine of the character described a threading member and means for driving said threading member, said means including a rotary worm gear, a stationary worm gear, a worm meshing with each of said gears, said worm gears being right and left, a pinion connected with each of said worms, a gear meshing with each of said pinions, a power shaft secured to both of said gears for rotating the same, and a casing rotatably mounted on the stationary worm gear, said casing carrying said shaft whereby as the shaft is independently rotated it will bodily move around the stationary worm gear with the casing and will cause the other worm gear to rotate at double speed.

8. In a pipe threading machine a head, a plurality of thread cutting members arranged in said head, said head being provided with a depending sleeve having a number of apertures therein, a threaded member in each of said apertures, a primary gear having a threaded extension fitting the threads of said threaded members, means for rigidly clamping said primary gear to the pipe to be threaded, and means for rotating said head whereby as said head rotates the sleeve will be also rotated and fed longitudinally of the pipe according to the pitch of the threads on said threaded member.

9. In a thread cutting machine of the character described a head, cutting members arranged in said head, driving means for rotating said head and means for feeding the head longitudinally of the pipe to be threaded, said means including a stationary threaded member clamped to the pipe, and a plurality of threaded members carried by said sleeve, said members being disengageable from the threaded member clamped to the pipe whereby the head may be moved longitudinally of the pipe through the action of the threaded members and longitudinally independent of the threaded members.

10. In a pipe threading machine of the character described a plurality of cutting members, means for driving the cutting members and means for feeding the cutting members longitudinally of the pipe, said means including a sleeve having a plurality of apertures therein, a threaded bar in each of said apertures, a stationary threaded member co-acting with said threaded bars, and means for moving said bars inwardly and outwardly through said apertures and engage and disengage said stationary threaded member.

11. In a pipe threading machine of the character described a plurality of cutters, means for rotating said cutters and means for moving the cutters longitudinally of the pipe being threaded, said means including an annular flange having a plurality of apertures, said flange surrounding said pipe, a plurality of threaded plates arranged in said apertures, a stationary member having a threaded portion adapted to engage the threads of said plates when the plates are moved outwardly through the apertures, a spring for each of the plates for moving the plates inwardly through the apertures, and a manually actuated cam sleeve for moving the plates outwardly against the action of said spring so as to engage the threads of said stationary member.

12. In a machine for threading pipes a plurality of thread cutting members, means for rotating said thread cutting members and means for feeding said thread cutting members longitudinally of the pipe, said means including an annular flange having a plurality of apertures therein, radially movable plates arranged in said apertures, said plates having threads, a stationary threaded member adapted to mesh with the threads of said plates when the plates are forced outwardly through the apertures, spring means for moving the plates inwardly through the apertures, and a manually actuated cam sleeve for moving the plates outwardly against the action of said springs, said sleeve being formed with a number of depressed portions for receiving said plates when moved to a predetermined position.

13. In a thread cutting machine for pipes, a driving mechanism, a head rotated by said driving mechanism, a plurality of thread cutting members carried by the head, a tapering cam for each of the thread cutting members, and means extending through said head for shifting said cams so that the thread cutting members will be held in operative position for threading different sized pipes.

14. In a thread cutting tool for pipes a driving mechanism, a head rotated by said driving mechanism, a plurality of thread cutting members carried by the head and movable radially, a tapering cam for each of the cutting members for varying their position radially, a ring connected with the cams for manually shifting the position thereof, the connection between the ring and the cams being loose in a radial direction, and a cam post for each of said cams provided with a tapering face, said post extending longitudinally of the pipe to be cut whereby as the head is rotated the respective cams and their cutters will gradually move outwardly to maintain contact with said faces.

15. In a thread cutting machine for cutting threads on pipes a driving mechanism, a head rotated by said driving mechanism, a plurality of bars extending through said head, each of said bars having a bevel surface facing said pipe, a thread cutting member for each of said bars arranged between the center of the pipe and the respective bars and movable radially, an arc-shaped cam tapering from one end to the other arranged in said head for each of the cutters and positioned between the cutting members and said beveled surfaces, a rotatable ring for manually adjusting said cams, said ring having a radial slot for each cam, a screw extending through each of said slots into the cams for connecting the cams and rings so that they will simultaneously rotate together while the cams are allowed independent radial movement.

16. In a thread cutting machine of the character described a driving mechanism, a head rotated by said driving mechanism, a plurality of cutting members carried by said head and arranged to be adjusted radially, a cam for varying the position of said cutting members, a ring secured to said cam for adjusting the same, and an auxiliary cam rotatably mounted between the first mentioned cam and the cutting members.

17. In a thread cutting tool of the character described a rotatable head, a plurality of radially movable cutting members carried by said head, a substantially arc-shaped cam for each of the cutting members, a ring for adjusting the cams, means for gradually rotating said ring as the device is operated so as to permit the threading members to move radially and thereby produce a tapering thread, and an auxiliary cam arranged between each of the first mentioned cams and the threading members, said auxiliary cam being manually adjustable to cause the threading members to cut different sized pipes.

18. In a thread cutting tool of the character described a driving mechanism, a head rotated by said driving mechanism, a plurality of carriages radially movable on said head, a thread cutting member carried by each of the carriages, a threaded member for moving the carriages radially, and automatically actuated means for moving the carriage in a reverse direction as the threads are being cut so as to produce a tapered thread.

19. In a thread cutting machine of the character described a driving mechanism, a head rotated by said driving mechanism, a plurality of carriages carried by said head and movable radially, a threaded member for each of the carriages for moving the same radially, a pinion secured to each of the threaded members, an annular rack engaging all of the pinions for moving the carriages simultaneously radially in either direction, and a thread cutting member carried by each of said carriages.

20. In a combined pipe cutting and threading machine of the character described a driving mechanism, a rotatable head driven by said driving mechanism, a plurality of radial movable carriages carried by said head, a thread cutting member carried by each carriage, a cutting off tool carried by each carriage, an operating member for moving each carriage radially independently, said operating members each having a pinion, an annular rack continually meshing with all of said pinions, a driving pinion meshing with said rack, a shaft secured to said driving pinion, a gear secured to said shaft, a rack meshing with said gear, and means for connecting said rack with the means for rotating the head whereby as the head is rotated the annular rack will be gradually rotated and consequently feed said carriages radially.

THADDIOUS V. ELLIOTT.
CHARLES SCHAEFER.